United States Patent [19]

Matsuzawa et al.

[11] Patent Number: 5,340,631
[45] Date of Patent: Aug. 23, 1994

[54] CLATHRATE INCLUSION COMPOUNDS AND OPTICAL RECORDING MEDIUM USING THE SAME

[75] Inventors: Nobuyuki Matsuzawa; Yoko Hayashi; Masafumi Ata; Shin-Ichiro Tamura, all of Kanagawa, Japan

[73] Assignee: Sony Corporation, Tokyo, Japan

[21] Appl. No.: 159,034

[22] Filed: Nov. 29, 1993

Related U.S. Application Data

[63] Continuation of Ser. No. 750,922, Aug. 28, 1991, abandoned.

[30] Foreign Application Priority Data

Aug. 31, 1990 [JP] Japan .................................. 2-228086

[51] Int. Cl.$^5$ ................................................ B32B 3/02
[52] U.S. Cl. .......................................... 428/64; 428/65; 428/913; 430/945; 346/76 L; 346/135.1; 369/283; 369/288
[58] Field of Search .......................... 428/64, 65, 913; 430/270, 945; 346/76 L, 135.1; 369/283, 284, 288

[56] References Cited

U.S. PATENT DOCUMENTS

| | | | |
|---|---|---|---|
| 4,693,915 | 9/1987 | Matsuda et al. | 427/256 |
| 4,839,269 | 6/1989 | Okazaki et al. | 430/570 |
| 4,904,574 | 2/1990 | Suzuki | 430/372 |
| 4,933,948 | 6/1990 | Herkstroeter | 372/53 |
| 4,987,021 | 1/1991 | Kanno | 430/945 |
| 5,154,958 | 10/1992 | Namba et al. | 428/64 |
| 5,204,220 | 4/1993 | Yanagisawa et al. | 430/275 |

OTHER PUBLICATIONS

Kirk-Othmer Encyclopedia of Chemical Technology, 3rd ed., vol. 6, 1979.
J. March, Advanced Organic Chemistry, pp. 74-81, (1985).

*Primary Examiner*—Patrick J. Ryan
*Assistant Examiner*—Marie R. Macholl
*Attorney, Agent, or Firm*—Hill, Steadman & Simpson

[57] ABSTRACT

A clathrate inclusion compound consisting essentially of a cyanine dye and organic host molecules including the cyanine dye therein is described. By the inclusion, the degradation of the cyanine dye by the attack of oxygen is avoided with respect to the absorbance, reflectance and the like characteristics. Optical recording media using the inclusion compound are also described.

3 Claims, 5 Drawing Sheets

CLATHRATE INCLUSION COMPOUNDS AND OPTICAL RECORDING MEDIUM USING THE SAME

This is a continuation, of application Ser. No. 07/750,922, filed Aug. 28, 1991, now abandoned.

BACKGROUND OF THE INVENTION

1. Field of the Invention

This invention relates to optical recording materials and more particularly, to clathrate inclusion compounds which are adapted for use as a recording layer of optical recording media with which information is recorded or reproduced by irradiation of laser beams. The invention also relates to such optical recording media.

2. Description of the Prior Art

As is known in the art, optical recording media of the type in which information is recorded and reproduced by irradiation of laser beams have a great memory capacity and suffer little mechanical degradation because of recording and reproducing operations in a contact-free condition. Thus, such media have been accepted as those media which are adapted for storage and retrieval of a great quantity of information.

In general, the optical recording medium includes a substrate and a recording layer comprised of an optical recording material and formed on the substrate. On recording, a laser beam is converged on the recording layer to thermally change the material on the converged portions, thereby forming bits. For the reproduction of the recorded information, the difference in reflectance between the bit portion and the bit-free portion is detected and utilized.

In order for the successful recording and reproduction by the use of the optical recording medium of the type stated above, the optical recording material used as the recording layer should meet the requirements such as high sensitivity to heat, the capability of forming bits with a good configuration, a high reflectance in a laser beam wavelength, and good ability of storage.

Recently, attention has been directed to cyanine dyes as an optical recording material which can satisfy the above requirements. The cyanine dye is a so-called "perforation-type" optical recording material wherein the layer is perforated with heat generated on absorption of a laser beam. In fact, when used as an optical recording material, the cyanine dye has a number of advantages such as a great absorption in a laser beam wavelength with high sensitivity, small thermal conductivity and thermal diffusivity with the possibility that pits with a good configuration can be formed, a great reflectivity in a laser beam wavelength, high solubility in organic solvent and the like.

However, the cyanine dyes are disadvantageous in that the light fastness is poor. More particularly, when cyanine dyes are returned to a ground state after conversion to a triplet excitation state by application of light, oxygen is activated to produce oxygen of a singlet state. The singlet state oxygen is so reactive that it is reacted with the methine chain of the cyanine dye to change the structure. Accordingly, the cyanine dye is degraded with respect to the absorbance, reflectance and the like characteristics, making it difficult to perform good recording and reproducing operations.

In order to prevent the influence of the singlet state oxygen, it has been proposed to add substances capable of efficiently quenching the singlet state oxygen to the cyanine dye or to interrupt light with a short wavelength addition of UV absorbers or by coloration of a substrate.

SUMMARY OF THE INVENTION

It is accordingly an object of the invention to provide clathrate inclusion compounds which are useful as an optical recording medium and which has good light fastness without a sacrifice of absorbance, reflectance and the like optical characteristics by application of light.

It is another object of the invention to provide an optical recording medium which includes the clathrate inclusion compound in a recording layer.

The clathrate inclusion compound according to the invention consists essentially of a cyanine dye and organic host molecules including the cyanine dye therein. An optical recording medium of the invention comprises a support and a recording layer comprised of the clathrate inclusion compound. Preferably, the recording layer consists essentially of the clathrate inclusion compound.

BRIEF DESCRIPTION OF THE INVENTION

Figure 3:
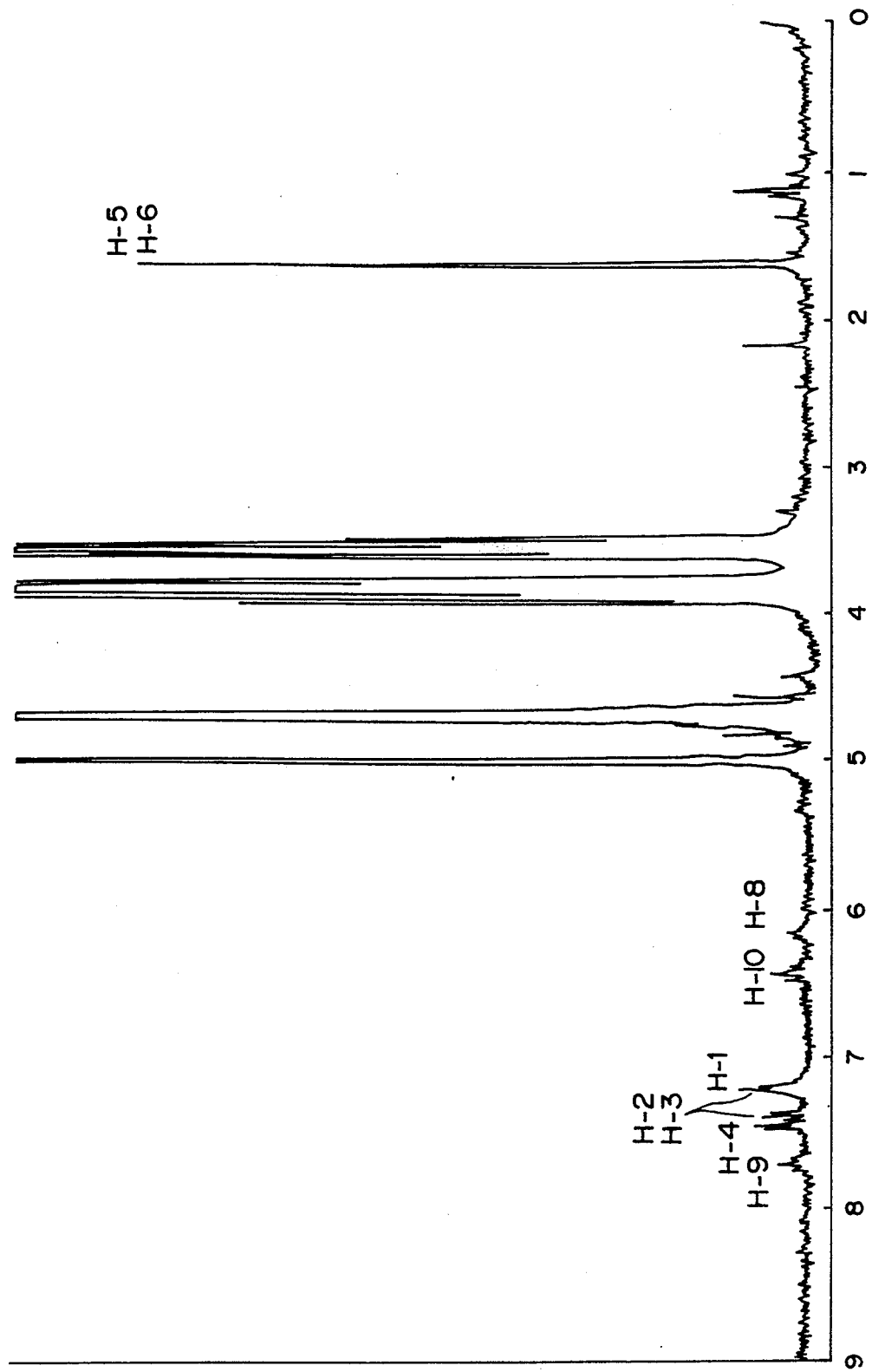
Figure 4:
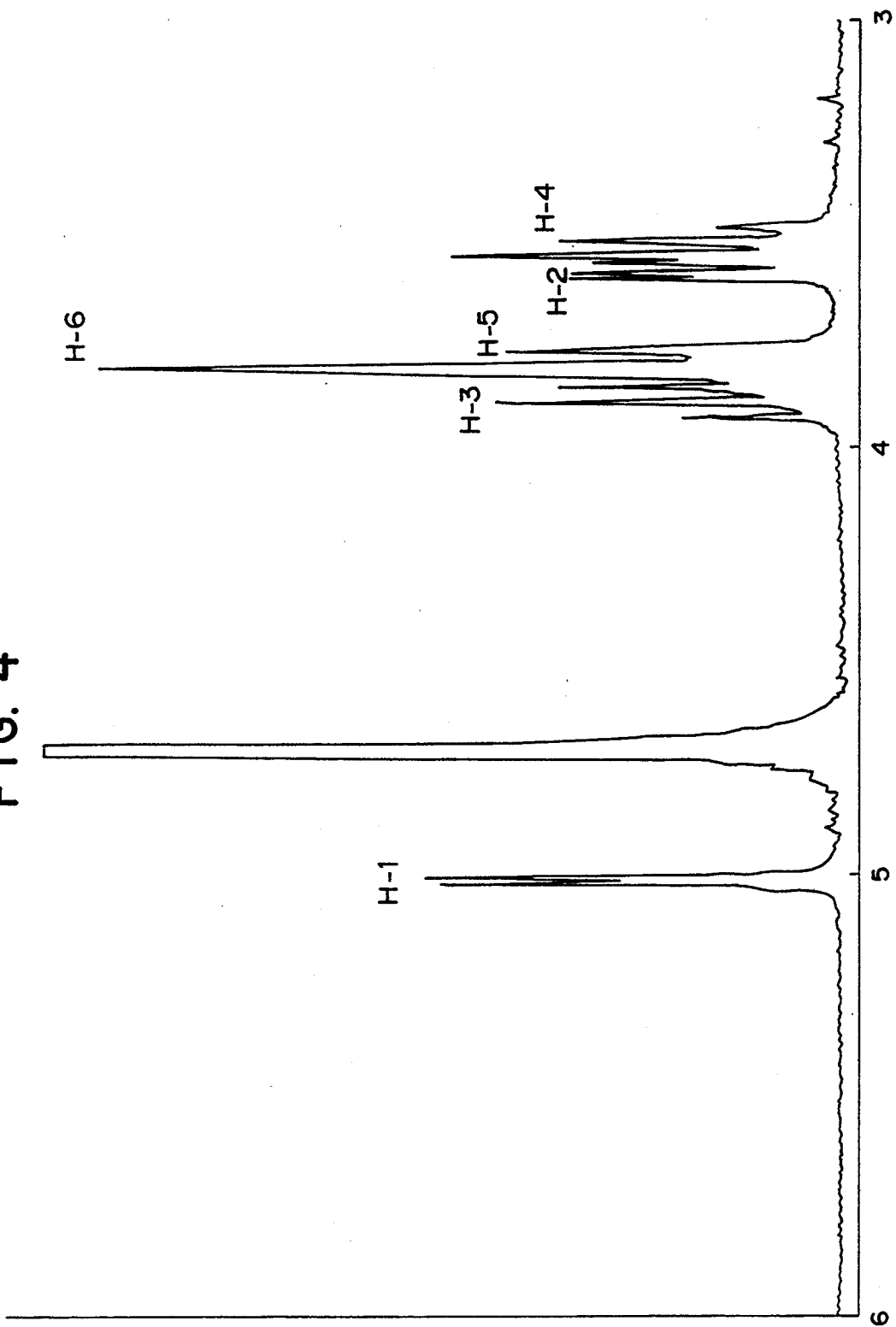
Figure 5:
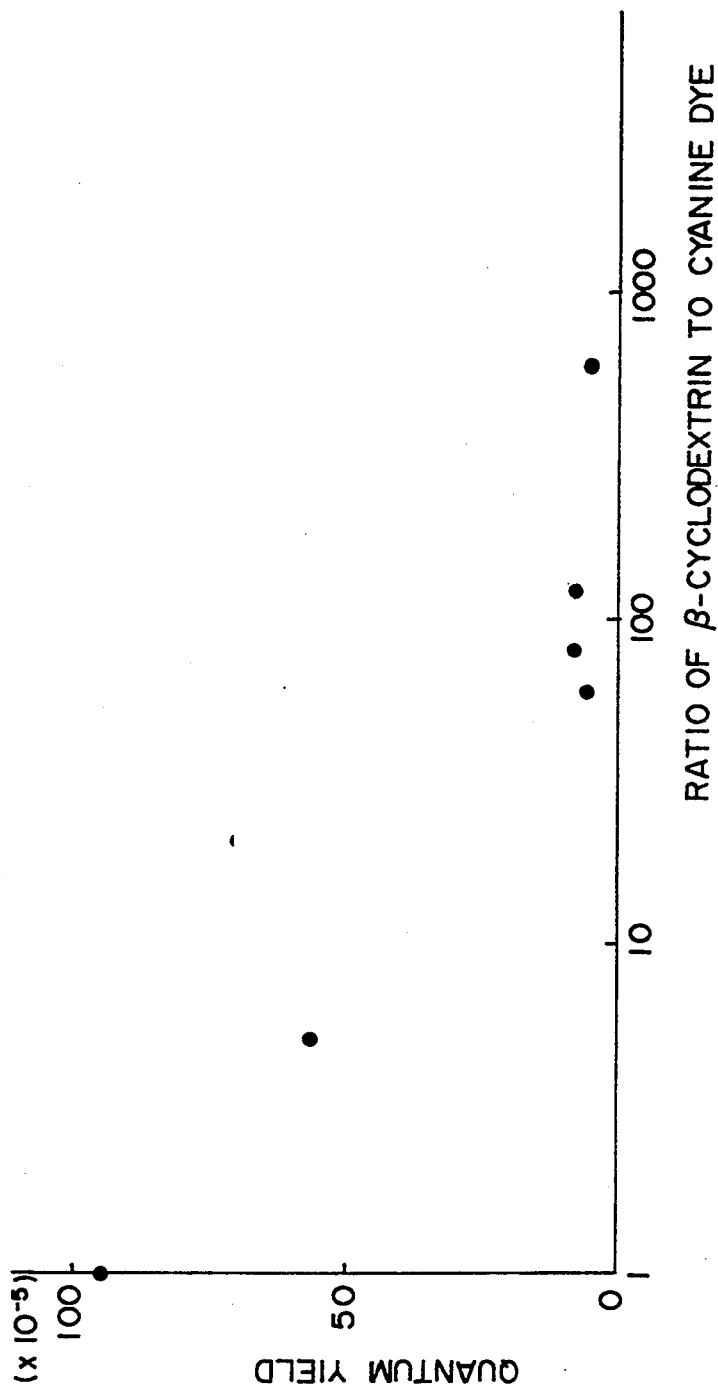

FIGS. 3 and 4 are, respectively, $^1$H-NMR spectrum charts of mixed solutions of a cyanine dye and $\beta$-cyclodextrin wherein FIG. 3 is a $^1$H-NMR spectrum chart of the solution mainly composed of the cyanine dye and FIG. 4 is a $^1$H-NMR spectrum chart of the solution mainly composed of the $\beta$-cyclodextrin; and FIG. 5 is a graphical representation of the relation between the quantum yield and the ratio in concentration of $\beta$-cyclodextrin to a cyanine dye.

DETAILED DESCRIPTION AND EMBODIMENTS OF THE INVENTION

The clathrate inclusion compound according to the invention comprises a cyanine dye and organic host molecules including the cyanine dye therein. The organic host molecules are added in order to prevent the singlet state oxygen of the cyanine dye, as will be produced by irradiation of light, from coming close to the methine chain of the cyanine dye. The host molecule may be on which includes part or all of the methine chain of the cyanine dye. Examples of such host molecule include dextrins such as $\alpha$, $\beta$, $\gamma$-dextrins, crown ethers, calixarene and the like. These organic host molecules have such a molecular structure that a plurality of cyclic units are assembled to form a cylindrical structure. It is assumed that the cyanine dye molecule is incorporated in the cylindrical structure to form an inclusion compound. When the cyanine dye is included as set out above, the singlet state oxygen can be prevented from contact with the methine chain of the cyanine dye. Thus, the degradation of the characteristic properties of the cyanine dye with the singlet state oxygen can be prevented.

For the preparation of the clathrate inclusion compound of the invention, it is sufficient to mix a cyanine dye and organic host molecules in a polar solvent. Since the organic host molecules are hydrophobic in the inside thereof, the cyanine dye having hydrophobic properties is readily incorporated in the organic host molecules to form an inclusion compound.

The cyanine dyes useful in the present invention may be those dyes which are known in the art as an optical recording material and include, for example, one mentioned in examples appearing hereinafter. The cyanine dye used in the example is preferably used in the practice of the invention.

The inclusion compound of the invention has good characteristics such as absorbance, reflectance and the like, in a laser beam wavelength and can be appropriately used as an optical recording medium.

The recording medium of the invention comprises a support and a recording layer comprised of the inclusion compound set out hereinabove. The recording layer preferably consists essentially of the inclusion compound. The support may be made of any known material in the art. The recording layer may be formed by any known techniques with or without use of a resin binder without limitation.

The present invention is more particularly described by way of example.

In the example, it is illustrated that a cyanine dye is included in β-cyclodextrin used as organic host molecules.

Initially, the state of the inclusion of a cyanine dye in β-cyclodextrin used as the organic host molecule was checked by subjecting to NMR analysis.

More particularly, a cyanine dye solution with a concentration of $2.70 \times 10^{-4}$ mols/liter in $D_2O$, a β-cyclodextrin solution with a concentration of $1.05 \times 10^{-3}$ mols/liter in $D_2O$, a mixed solution in $D_2O$ of a cyanine dye and β-cyclodextrin at a ratio of about 1:4 ($2.38 \times 10^{-4}$ mols/liter:$8.35 \times 10^{-4}$ mols/liter) were, respectively, prepared. The respective solutions were subjected to measurement of $^1$H-NMR of the cyanine dye and β-cyclodextrin.

The cyanine dye used was Cyanine Dye NK125 available from Japanese Photosensitive Dye Research Co., Ltd. β-Cyclodextrin available from Tokyo Chem. Ind. Co., Ltd., was purified by re-precipitation from $H_2O$ and heated in vacuum at 70° C. to remove the crystal water therefrom.

The cyanine dye and β-cyclodextrin have, respectively, the following structural formulas (I) and (II)

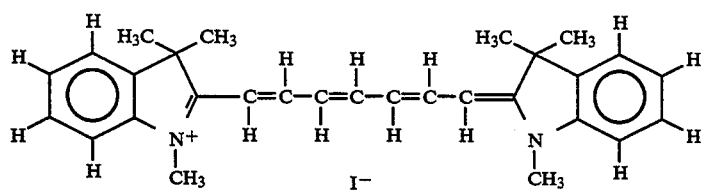

I

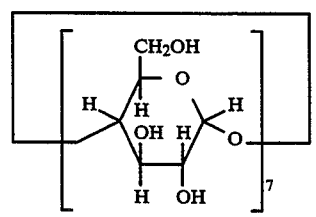

II

For the measurement of NMR, an NMR measuring instrument of Nippon Electric Co., Ltd., was used wherein sodium 3-(trimethylsilyl)propionate (Merck Inc.) was used as an internal standard and the measurement was effected at room temperature.

Figure 1:
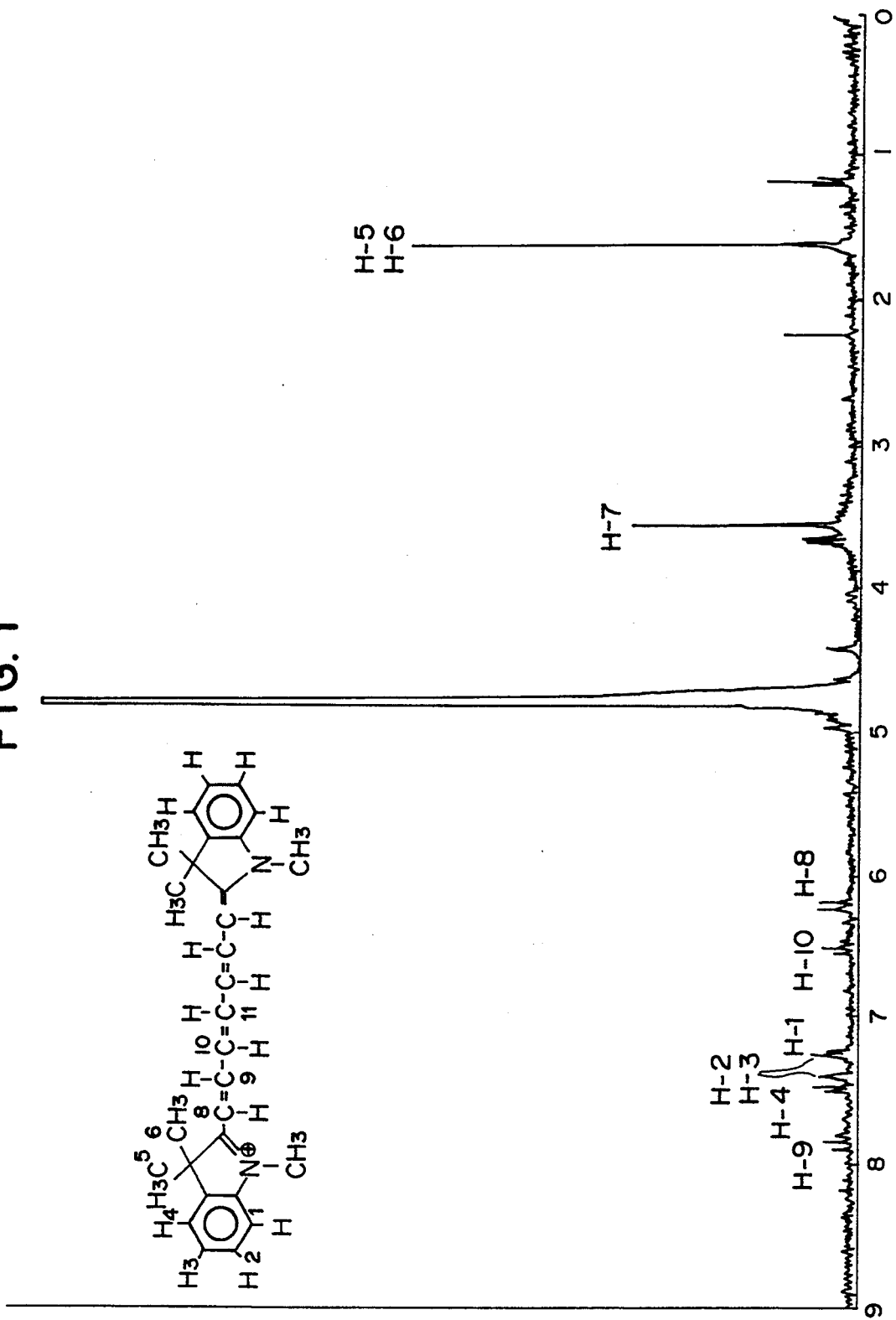
FIG. 1 is a $^1$H-NMR spectrum chart of a cyanine dye in a solution of the cyanine dye alone.
Figure 2:
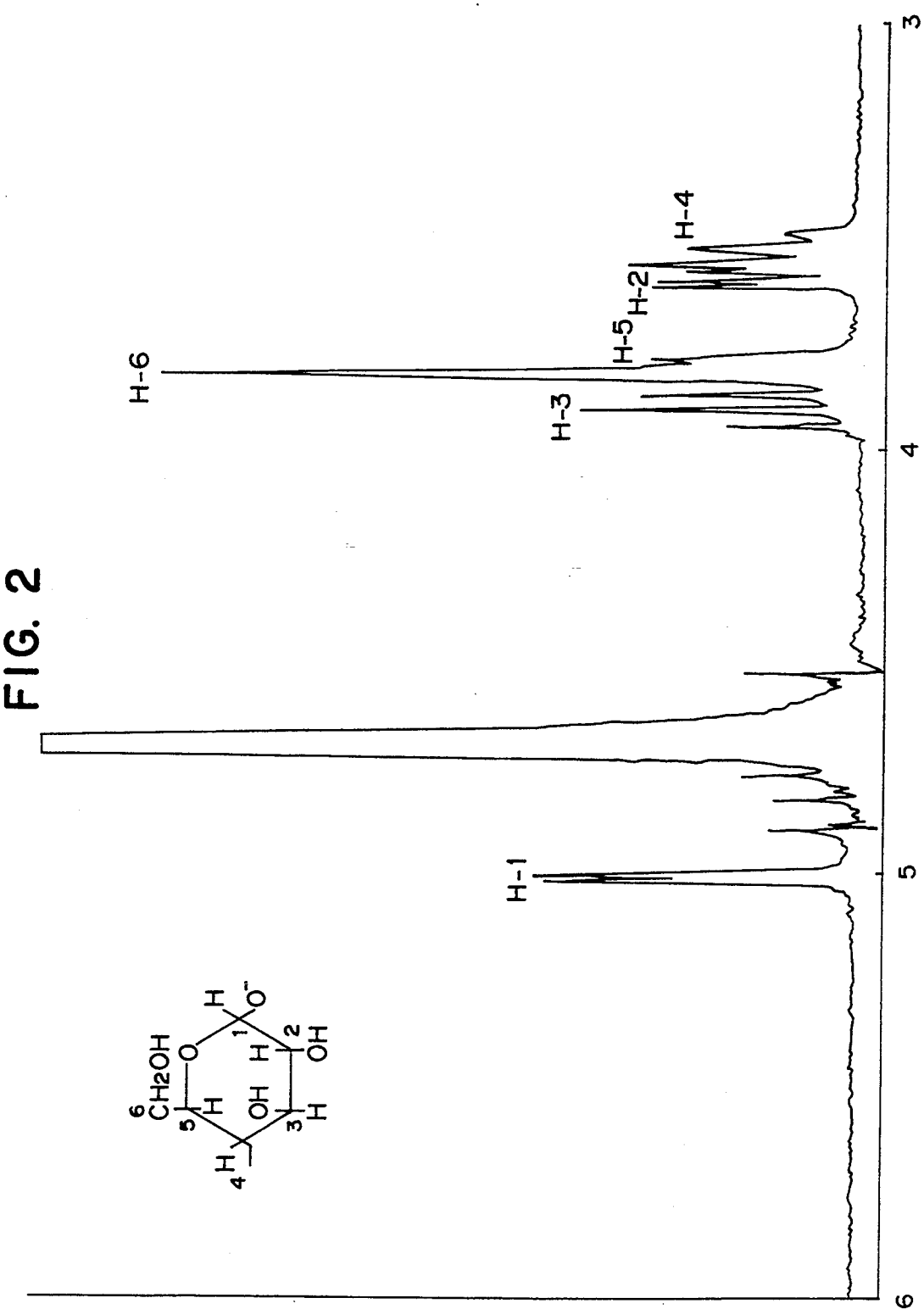
FIG. 2 is a $^1$H-NMR spectrum chart of $\beta$-cyclodextrin in a solution of the $\beta$-cyclodextrin alone.

FIG. 1 shows a $^1$H-NMR spectrum chart of a cyanine dye in a solution of the cyanine dye alone, FIG. 2 shows a $^1$H-NMR spectrum chart of β-cyclodextrin in a solution of the β-cyclodextrin alone, and FIGS. 3 and 4 are, respectively, $^1$H-NMR spectrum charts of mixed solutions of a cyanine dye and β-cyclodextrin. FIG. 3 shows a $^1$H-NMR spectrum chart mainly of the cyanine dye and FIG. 4 shows a $^1$H-NMR spectrum chart mainly of the β-cyclodextrin. The attributions of proton corresponding to the NMR signals are also shown in the respective figures by numbering the positions in the structural formulas of the cyanine dye and β-cyclodextrin.

The chemical shifts of the protons of the cyanine dye and β-cyclodextrin were observed based on these $^1$H-NMR spectra.

In Table 1, there are shown the results of the chemical shifts of the cyanine dye protons in the solution of the cyanine dye alone and the mixed solution of the cyanine dye and β-cyclodextrin.

TABLE 1

| | Chemical Shift (ppm) | | |
|---|---|---|---|
| | Cyanine Dye | Cyanine Dye + β-cyclodextrin | Variation in the Chemical Shift (ppm) |
| H-1 | 7.28 | 7.23 | −0.05 |
| H-2 | 7.42 | 7.40 | −0.02 |
| H-3 | | | |
| H-4 | 7.50 | 7.46 | −0.04 |
| H-5 | 1.64 | 1.63 | −0.01 |
| H-6 | | | |
| H-7 | 3.56 | — | — |
| H-8 | 6.19 | 6.15 | −0.04 |
| H-9 | 7.85 | 7.72 | −0.13 |
| H-10 | 6.53 | 6.46 | −0.07 |
| H-11 | — | — | — |

From Table 1, it will be seen that the values of the chemical shifts at H-9 and H-10 corresponding to the methine chain moieties are greatly changed by mixing of the cyanine dye and β-cyclodextrin. This suggests that a great change takes place at the chemical environment surrounding H-9 and H-10, i.e. in the mixed solution, the methine chain moieties of the cyanine dye are included with the β-cyclodextrin.

The results of the measurement on the proton chemical shifts of β-cyclodextrin in the solution of β-cyclodextrin alone and the mixed solution of the cyanine dye and β-cyclodextrin are shown in Table 2.

TABLE 2

| | Chemical Shift (ppm) | | |
|---|---|---|---|
| | β-cyclo-dextrin | Cyanine Dye + β-cyclodextrin | Variation in the Chemical Shift (ppm) |
| H-1 | 5.01 | 5.00 | −0.01 |
| in the solution of β-cyclodextrin alone and the mixed solution of the cyanine dye and β-cyclodextrin | | | |
| H-2 | 3.60 | 3.58 | −0.02 |
| H-3 | 3.91 | 3.88 | −0.03 |
| H-4 | 3.52 | 3.51 | −0.01 |
| H-5 | 3.79 | 3.76 | −0.03 |
| H-6 | 3.83 | 3.81 | −0.02 |

From Table 2, it will be seen that the mixing of β-cyclodextrin with the cyanine dye results in a great variation of the chemical shifts at H-3 and H-5 which are inner protons. This suggests that a great change takes place at the chemical environment surrounding H-3 and H-5, i.e. in the mixed solution, the β-cyclodextrin includes the cyanine dye therein.

In order to confirm the above results, the spin-lattice relaxation time of the protons of β-cyclodextrin was determined with respect to the solution of β-cyclodextrin alone and the mixed solution of the cyanine dye and β-cyclodextrin. The results are shown in Table 3.

TABLE 3

| | β-Cyclodextrin (ms) | Cyanine Dye + β-cyclodextrin (ms) |
|---|---|---|
| H-1 | 415 | 432 |
| H-2 | 717 | 691 |
| H-3 | 863 | 661 |
| H-4 | 403 | 396 |
| H-5 | — | 317 |
| H-6 | 245 | 254 |

From Table 3, it will be seen that when β-cyclodextrin is mixed with the cyanine dye, the relaxation time at H-3 which is inner proton is shortened. This means that the environment surrounding H-3 becomes more dense by the mixing with the cyanine dye, suggesting that in the mixing solution, β-cyclodextrin includes the cyanine dye therein.

The above results give evidence that β-cyclodextrin includes the methine chain moieties of the cyanine dye in the inside thereof and functions as organic host molecules.

Thereafter, the influence of β-cyclodextrin on the light fastness of the cyanine dye was checked. The light fastness of the cyanine dye was evaluated by determining the quantum yield of the cyanine dye at a wavelength of 365 nm.

β-Cyclodextrin was added to a cyanine dye solution with a concentration of $1.0 \times 10^{-5}$ mol/liter in $D_2O$ at a predetermined ratio to provide a sample. The sample was irradiated with light from a mercury lamp at a line spectrum wavelength of 365 nm and a variation in the absorbance at a wavelength of 736.8 nm was measured. Then the quantum yield was determined from the variation of the measured absorbance.

In FIG. 5, there is shown the relation between the ratio in concentration of β-cyclodextrin and the quantum yield of the cyanine dye. It will be noted that the filters used for the measurement of the absorbance was IRA-25S and UV-D35, both available from Toshiba Ltd.

In the figure, the ratio in the concentration of β-cyclodextrin means a concentration of β-cyclodextrin when the concentration of the cyanine dye is taken as 1.

As will be clear from FIG. 5, the quantum yield of the cyanine dye is lowered depending on the ratio of the β-cyclodextrin. At a concentration ratio of β-cyclodextrin of 1000, the quantum yield is reduced to about 1/17 of the quantum yield ($1.02 \times 10^{-3}$) of the sample which is free of any β-cyclodextrin. Thus, the light fastness of the cyanine dye is found to be significantly improved the the addition of β-cyclodextrin.

The above results are true of the cases using other cyclodextrins, crown ethers and the like instead of β-cyclodextrin. In addition, the cyanine dye of the formula indicated before may be replaced by any known cyanine dye ordinarily used for this purpose, with similar results.

When the clathrate inclusion compound is applied as a recording layer of an optical recording medium, it has so high absorbance and reflectance in a wavelength range of laser beams that it is possible to optically record and reproduce information at high sensitivity and high accuracy. Moreover, these characteristics are not degraded by irradiation of light, reliable recording and reproduction are possible.

What is claimed is:

1. An optical recording medium comprising a support and a recording layer formed on said support, said recording layer comprising a clathrate inclusion compound which consists essentially of a cyanine dye and organic host molecules including the canine dye therein, wherein said organic host molecules have a molecular structure having a plurality of cyclic units assembled to form a cylindrical structure and are selected from the group consisting of α, β, and γ cyclodextrins, and wherein said cyanine dye is represented by the formula:

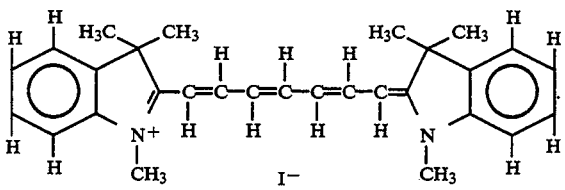

2. An optical recording medium comprising a support and a recording layer formed on said support, said recording layer comprising a clathrate inclusion compound which consists essentially of a cyanine dye and organic host molecules including the cyanine dye therein, wherein said organic host molecules have a molecular structure having a plurality of cyclic units assembled to form a cylindrical structure and are β-cyclodextrins, and wherein said cyanine dye is represented by the formula:

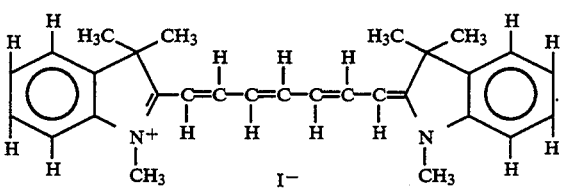

3. An optical recording medium comprising a support and a recording layer formed on said support, said recording layer comprising a clathrate inclusion compound which consists essentially of a cyanine dye and organic host molecules including the cyanine dry therein, wherein said organic host molecules have a molecular structure having a plurality of cyclic units assembled to form a cylindrical structure and are crown ethers, and wherein said cyanine dye is represented by the formula:
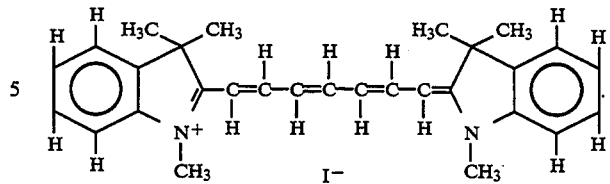
* * * * *